T858,023

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 725

755,456

PHOTOCHEMICAL PURIFICATION OF KETONES

George B. Vermont, Wilmington, Del., assignor to E. I. du Pont de Nemours and Company, Wilmington, Del., a corporation of Delaware Continuation of application Ser. No. 484,446, Sept. 1, 1965. This application Aug. 26, 1968. Published Jan. 21, 1969

Class 204—158

No Drawing. 10 Pages Specification

A process for purification of an ultraviolet light stable reaction product of ketenes which contains diketone and B-lactone impurities that have the following respective structural formulas:

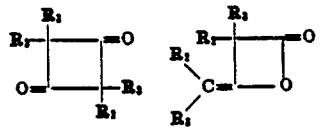

I II in which $R_2$ and $R_3$ are individually selected from the group consisting essentially of H and a lower alkyl group by exposing the reaction product to an ultraviolet light source of 2000 to 3000 angstroms until the above impurities are photochemically decomposed into gaseous products.